United States Patent [19]

Knutsen

[11] Patent Number: 4,839,852
[45] Date of Patent: Jun. 13, 1989

[54] PROGRAMMABLE CONTROLLER WITH SELF TESTING I/O STRUCTURE

[75] Inventor: Neil W. Knutsen, Milwaukee, Wis.

[73] Assignee: Allen-Bradley Company, Inc., Milwaukee, Wis.

[21] Appl. No.: 208,848

[22] Filed: Jun. 16, 1988

Related U.S. Application Data

[63] Continuation of Ser. No. 780,832, Sep. 27, 1985, abandoned.

[51] Int. Cl.⁴ .............................................. G06F 13/10
[52] U.S. Cl. ..................................................... 364/900
[58] Field of Search ... 364/200 MS File, 900 MS File

[56] References Cited

U.S. PATENT DOCUMENTS

| | | | |
|---|---|---|---|
| 3,810,118 | 5/1974 | Kiffmeyer . | |
| 3,942,158 | 3/1976 | Dummermuth | 364/900 |
| 3,992,654 | 11/1976 | Springer et al. . | |
| 3,997,879 | 12/1976 | Markley et al. | 364/900 |
| 4,078,259 | 3/1978 | Soulsby et al. | 364/900 |
| 4,095,094 | 6/1979 | Struger et al. | 364/900 |
| 4,118,789 | 10/1978 | Casto et al. | 364/900 |
| 4,118,792 | 10/1978 | Struger et al. | 364/900 |
| 4,151,580 | 4/1979 | Struger et al. . | |
| 4,152,750 | 5/1979 | Bremenour et al. . | |
| 4,165,534 | 8/1979 | Dumermuth et al. | 364/900 |
| 4,404,651 | 9/1983 | Grudowski . | |
| 4,413,319 | 11/1983 | Schultz et al. | 364/200 |
| 4,442,504 | 4/1984 | Dummermuth et al. | 364/900 |
| 4,535,456 | 8/1985 | Bauer et al. | 364/900 |
| 4,633,466 | 12/1986 | Laws et al. | 371/16 |

FOREIGN PATENT DOCUMENTS 1580808 11/1977 Japan .
WO8404977 12/1984 PCT Int'l Appl. .

Primary Examiner—Gareth D. Shaw
Assistant Examiner—Debra A. Chun
Attorney, Agent, or Firm—Quarles & Brady

[57] ABSTRACT

A programmable controller includes a processor unit which connects to one or more I/O units that connect to sensing devices and operating devices on equipment being controlled. When placed in the RUN mode, the processor determines the number of I/O units required to execute the user control program, and during each subsequent I/O scan, the number of connected and operating I/O units is checked to insure proper operation.

4 Claims, 7 Drawing Sheets

PROGRAMMABLE CONTROLLER WITH SELF TESTING I/O STRUCTURE

This application is a continuation of application Ser. No. 780,832, filed 9-27-85, now abandoned.

BACKGROUND OF THE INVENTION

The field of the invention is programmable controllers such as those described in U.S. Pat. Nos. 3,810,118; 3,942,158; 4,165,534; and 4,442,504.

Programmable controllers are typically connected to industrial equipment such as assembly lines and machine tools to sequentially operate the equipment in accordance with a stored program. In programmable controllers such as those disclosed in the above cited patents, for example, the control program is stored in a memory and includes instructions which are read out in rapid sequence and executed to examine the condition of selected sensing devices on the controlled equipment, or to energize or de-energize selected operating devices on the controlled equipment contingent upon the status of one or more of the examined sensing devices.

The sensing devices and operating devices on the controlled equipment are connected to the programmable controller through input and output circuits which are arranged in separate I/O racks, or I/O modules. Such I/O racks may take a variety of forms such as those disclosed in U.S. Pat. Nos. 4,151,580; 3,992,654; and 4,152,750, and typically, more than one I/O rack is connected to the programmable controller. The I/O racks are connected together by an I/O bus and information is coupled between the I/O racks and the controller processor in accordance with an established protocol. Such protocols are relatively complex and require considerable fault detection and diagnostic hardware and software, such as that described in U.S. Pat. Nos. 4,118,792 and 3,997,879.

SUMMARY OF THE INVENTION

The present invention relates to a small, low cost programmable controller which includes a processor unit connected to one or more separate I/O units. More specifically, the processor unit includes: means for examining a control program stored in the processor unit and determining the number of I/O units required to execute the control program; means for determining the number of I/O units connected thereto when the processor unit is placed in its RUN mode; and means for indicating a fault when an insufficient number of I/O units are connected to the processor unit. Another aspect of the invention is a processor unit which repeatedly executes an I/O scan in which data is input from the I/O units and output to the I/O units, in which the number of I/O units connected to the processor unit is determined as part of each I/O scan and in which a fault is indicated if the number of connected I/O units changes while the processor is in the RUN mode.

A general object of the invention is to inhibit the operation of a programmable controller if an improper number of I/O units are attached to the processor unit. The control program instructions indicate the input and output devices which are required to properly operate the equipment being controlled. The control program is examined and then the I/O structure is examined to determine if the proper I/O units are attached.

Another object of the invention is to insure that the proper I/O units remain attached while the programmable controller is operating. During each I/O scan the integrity of the I/O structure is checked, and if I/O units have been removed or added, a fault condition is indicated.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
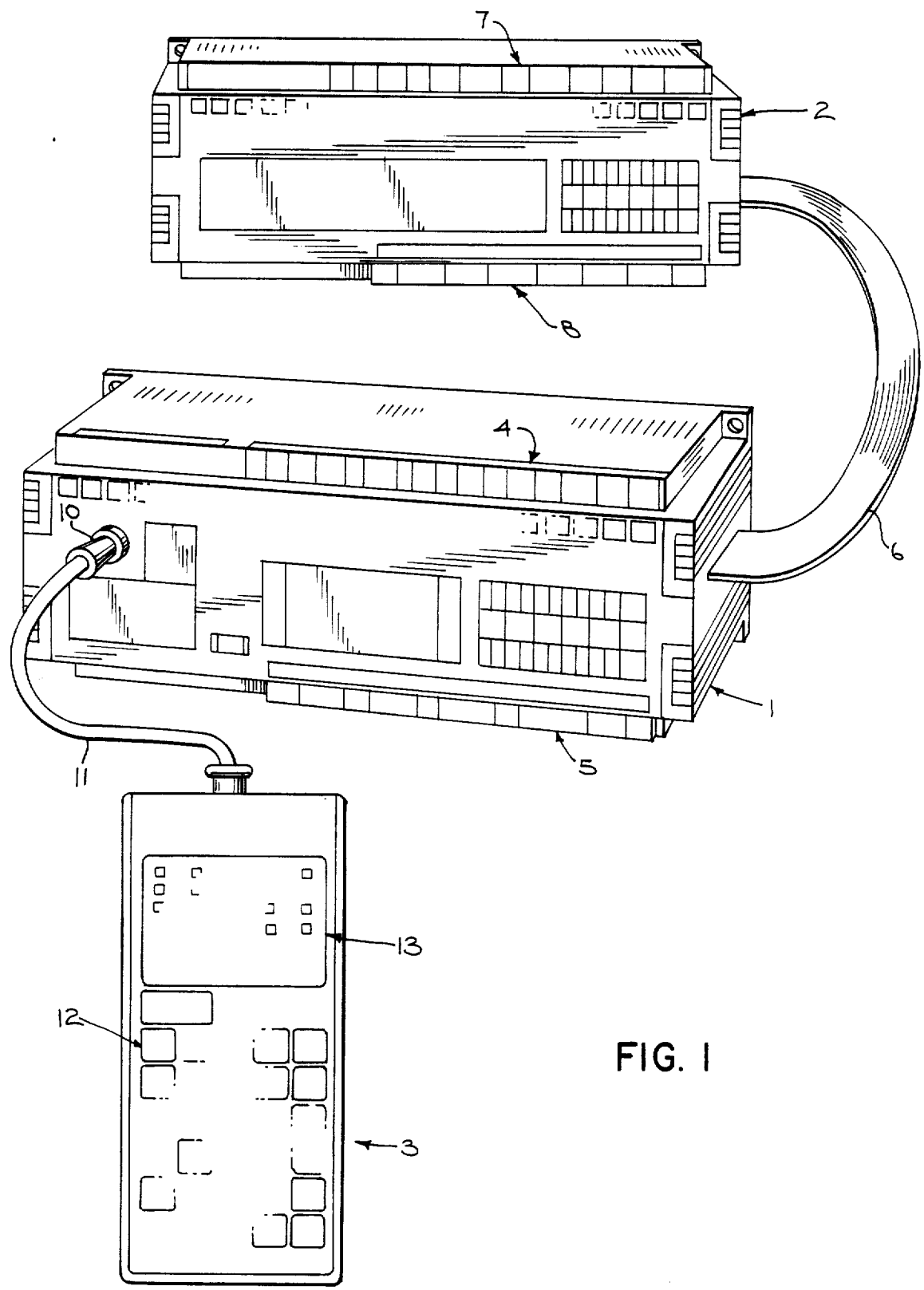
FIG. 1 is a pictoral view of a programmable controller system which incorporates the present invention.

Referring particularly to FIG. 1, the programmable controller of the present invention includes three separate components: a processor unit 1; an I/O expansion unit 2; and a programmer unit 3. The processor unit 1 stores a user control program which is executed when the system is in the "RUN" mode to examine the state of sensing devices connected to a set of ten input terminals 4, and to operate output devices connected to a set of six output terminals 5. The expansion I/O unit 2 connects to the processor unit 1 through a cable 6, and it provides ten additional input terminals 7 and six additional output terminals 8. Further expansion I/O units 2 can be chained together by cables 6 to provide up to 112 I/O points.

The programmer unit 3 is small enough to be held in the user's hand and it connects to a jack 10 on the front of the processor unit 1 through a cable 11. It includes a keyboard 12 through which the user may enter and edit a control program, and it includes a display 13 which enables the user to examine the control program. When the processor unit 1 has been programmed, the programmer unit 3 may be disconnected and used on other systems.

Figure 2:
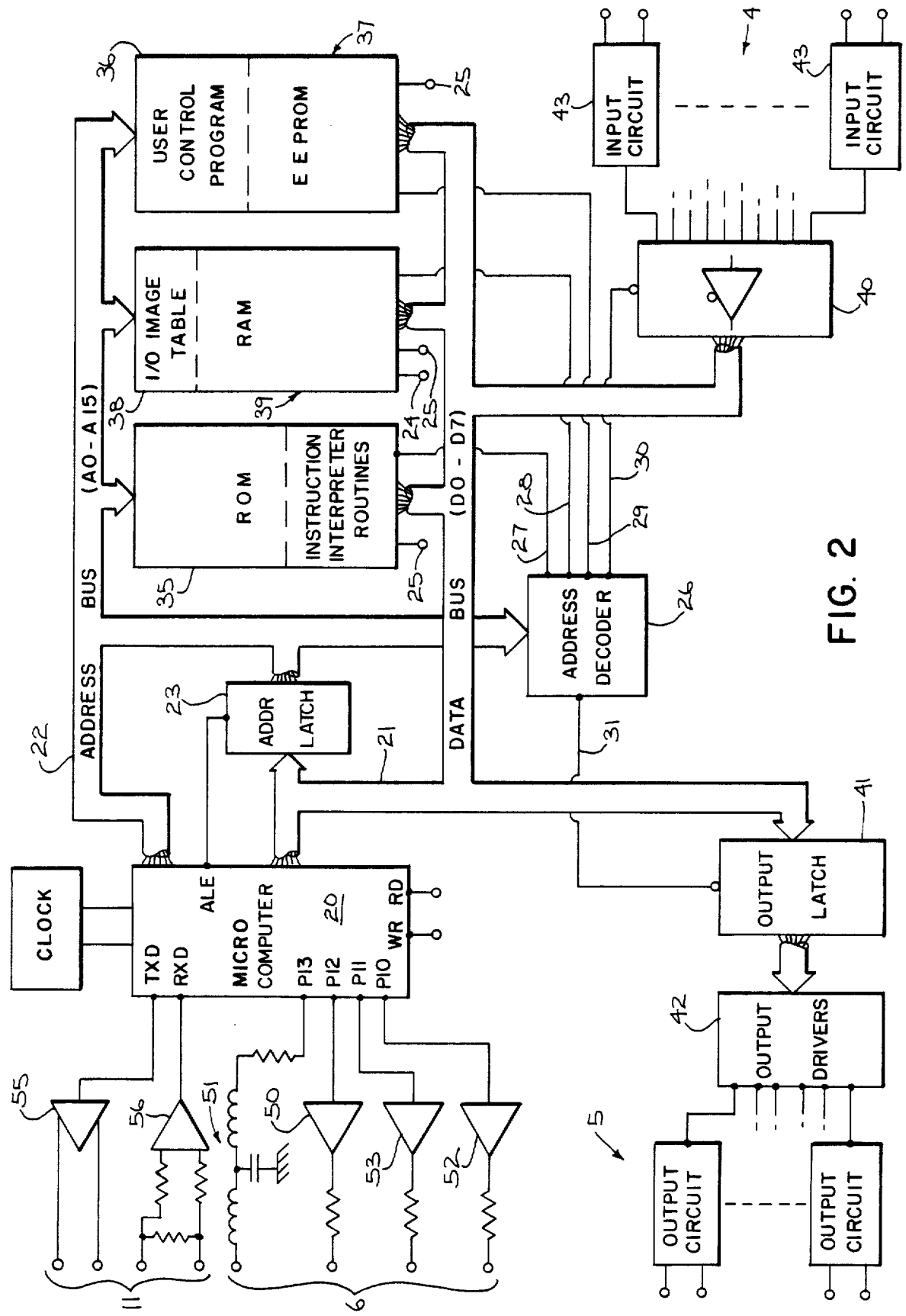
FIG. 2 is an electrical schematic diagram of the processor unit which forms part of the system of FIG. 1.

Referring particularly to FIG. 2, the processor unit 1 is structured about an 8-bit microcomputer 20 which drives an 8-bit data bus 21 and a 16-bit address bus 22. When the microcomputer 20 performs a read or write cycle, eight bits are first stored in an address latch 23. The outputs of this latch 23 drive the eight least significant digit leads in the address bus 22. The most significant bits are then produced on the address bus 22 by the microcomputer 20, and data is produced on the data bus 21. This data is written to an addressed device when a WR control line 24 is active, or data is read into the microcomputer 20 from an addressed device when a RD control line 25 is active. The higher order leads in the address bus 22 connect to an address decoder circuit 26 and one of five addressable devices is enabled through control lines 27-31.

The microcomputer 20 operates in response to machine instructions stored in a read-only memory (ROM) 35 to carry out the programmable controller functions. These functions include the execution of a user control program 36 which is stored in an electrically erasable read-only memory (EEPROM) 37. These functions also include the updating of an I/O image table 38 stored in a random access memory (RAM) 39.

The I/O image table 38 is updated by performing an I/O scan sequence in which the output status bits in the I/O table 38 are written to the corresponding output circuits, and the status of the input circuits are input to their corresponding locations in the input portion of the I/O image table 38. The status of the ten local inputs 4 are read in through a set of input circuits 43 and tri-state input gates 40, and the status of the output devices are written to an output latch 41. The output latch 41 connects through a set of six output drivers 42 to respective output circuits such as those disclosed in U.S. Pat. No. 3,745,546. Circuits such as those disclosed in U.S. Pat. Nos. 3,643,115 and 4,275,307 may be employed as the input circuits 43.

In addition to performing an I/O scan on the local inputs 4 and outputs 5, the microcomputer 20 also performs an I/O scan of the inputs 7 and outputs 8 on the I/O unit 2. This is accomplished by outputting data serially through a driver 50 which connects to a lead in the cable 6, and inputting serial data through a filter circuit 51 which connects to another lead in the cable 6. This serial data transfer is synchronized by a clock signal output through a driver 52 and a strobe signal output through a driver 53. As will be explained in further detail below, the output data is read from the I/O image table 38 and synchronously transmitted through the cable 6 to the I/O unit 2, and the status of each input 7 on the I/O unit 2 is then synchronously input through the filter 51 and written to the I/O image table 38. Up to six I/O units 2 may be connected in daisy chain fashion to this serial I/O channel.

Referring still to FIG. 2, the microcomputer 20 also executes a program stored in the ROM 35 to communicate with the programming unit 3 through the cable 11. This communication is through a full duplex serial port on the microcomputer 20 which connects to a line driver 55 and a line receiver 56. As will be explained in more detail below, the microcomputer 20 is programmed to input command data from the programming unit 3, and in response to the command, carry out the indicated function. Such a function may be, for example, the reading of a portion of the user control program 36 and outputting this data to the programming unit 3 for display. Conversely, another function may be to receive data from the programming unit 3 and write it to the stored user control program.

Figure 3:
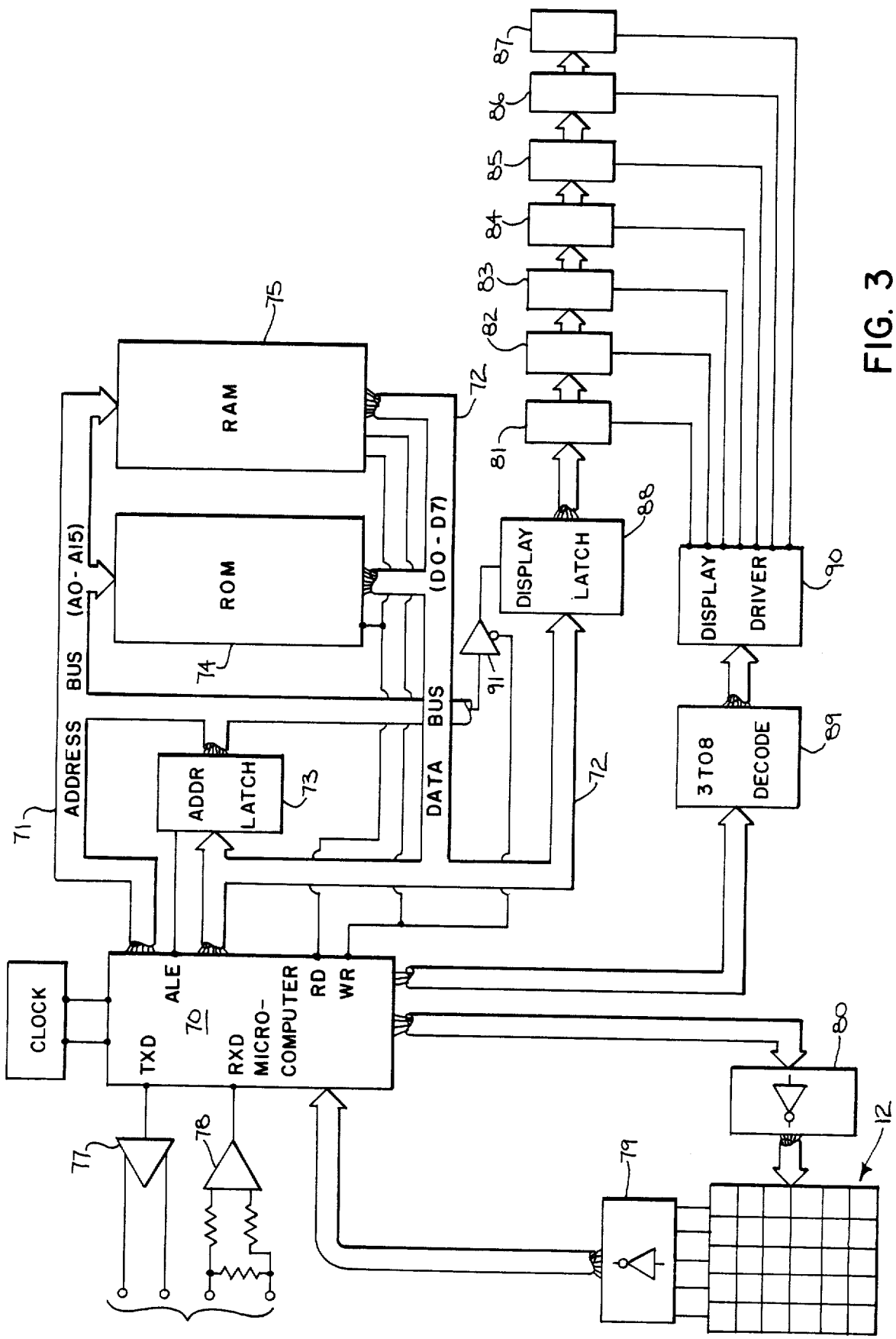
FIG. 3 is an electrical schematic diagram of the programming unit which forms part of the system of FIG. 1.

Referring particularly to FIG. 3, the programming unit 3 is also structured about an 8-bit microcomputer 70 which drives a 16-bit address bus 71 and an 8-bit data bus 72. The eight least significant bits of each address produced by the microcomputer 70 are applied to an address latch 73 and the same outputs are then used to couple with the data bus 72 during the subsequent read or write operation. The microcomputer 70 operates in response to machine instructions stored in a read-only memory (ROM) 74 and it operates on data stored in a random access memory (RAM) 75. The microcomputer 70 includes a full duplex serial port which connects to the cable 11 through a line driver 77 and a line receiver 78.

The keyboard 12 on the programming unit 3 is a 5 by 6 switch matrix with its five output lines connected through inverter gates 79 to input ports on the microcomputer 70. The keyboard 12 is repeatedly scanned for switch closures by sequentially enabling its six rows with a set of inverter gates 80 which are driven by outputs on the microcomputer 70. When a keyboard switch is closed, it is identified by its row and column, and the program branches to provide the appropriate response.

The display 13 on the programming unit 3 includes seven seven-segment display devices 81-87 which are each coupled to the data bus 72 by a display latch 88. A character is written to one of the display devices 81-87 by enabling the appropriate device through a 3-line-to-8-line decoder 89 and a set of display drivers 90 which are driven by three outputs P1 (0-2) on the microcomputer 70. The 3-bit code on these outputs selects one of the seven display devices 81-87 and a character is written to the display latch 88 by enabling a gate 91 with a write cycle to the proper address. A display register is stored in the RAM 75 and a display routine is repeatedly executed to update each display device 81-87 with the contents of this display register.

Figure 4:
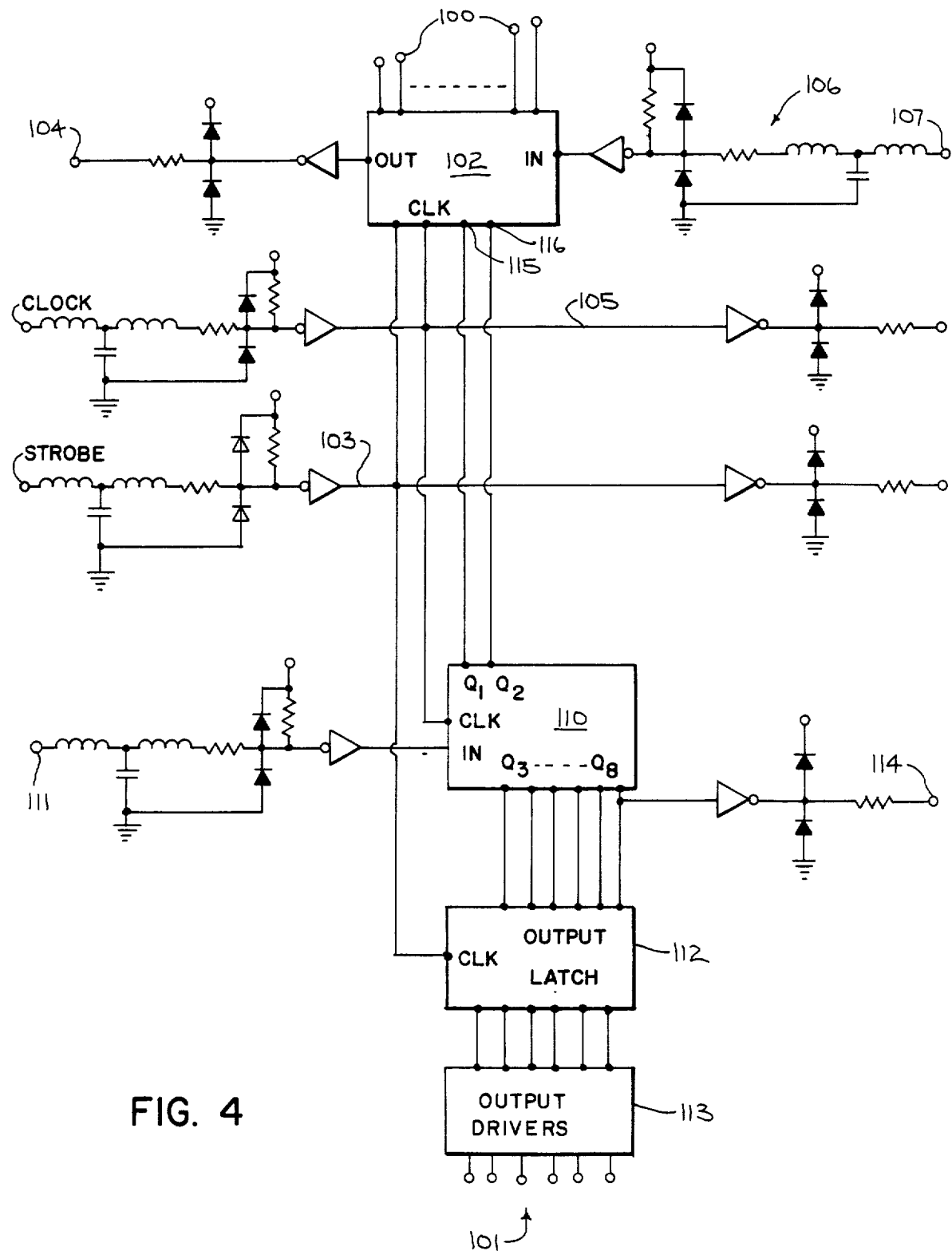
FIG. 4 is an electrical schematic diagram of the I/O unit which forms part of the system of FIG. 1.

Referring particularly to FIG. 4, each I/O unit 2 has ten inputs 100 and six outputs 101. The ten inputs 100 connect to the parallel inputs on a 16-bit shift register 102, and the state of these inputs are loaded into the shift register 102 when a strobe pulse is applied on the control line 103. The sixteen bits of input data is then shifted out a serial input line 104 in synchronism with clock pulses received through a control line 105. If the I/O unit 2 is connected to the processor unit 1, this serial input data is received by the microcomputer 20 therein and loaded into the input image table 38. Otherwise, this input data is shifted to the next closer I/O unit 2 in the daisy chain. The serial input on the shift register 102 is connected through a filter circuit 106 to an input terminal 107. As data is pushed through the shift register 102, new input data is shifted in from the input 107. If another I/O unit 2 is connected to the input 107, its input data is loaded into the shift register 102. Otherwise, logic lows are shifted into the register 102.

The clock control line 105 also operates an 8-bit output shift register 110. As the shift register 110 is clocked, serial data is received at input 111 and shifted into the register 110. Six of these bits are outputs which are stored in an output latch 112 when the strobe signal is received on control line 103. These latched outputs are applied to driver circuits 113 which operate the output devices that connect to the programmable controller.

As output data is shifted into the output register 110, the contents of the shift register 110 are shifted out through a terminal 114 to the next I/O unit 2 in the daisy chain. Thus, a series of 8-bit bytes of serial data may be shifted through the register 110 to other I/O units 2 in the daisy chain. This data which is in the register 110 when the strobe signal is received is latched for the outputs 101.

In addition to the six output bits, each byte of output data also includes two check bits. These appear at the $Q_1$ and $Q_2$ outputs on the shift register 110 and they are applied to two inputs 115 and 116 on the input shift register 102. Thus, the two check bits are output with the six output bits and are latched in the shift register 102 at the same moment the ten inputs are latched therein, and at the same moment that the six outputs are stored in the output latch 112. As will be explained in more detail below, the check bits are examined when they are shifted back into the processor unit 1 to ascertain if the I/O unit 2 is connected and is functioning properly.

Figure 5:
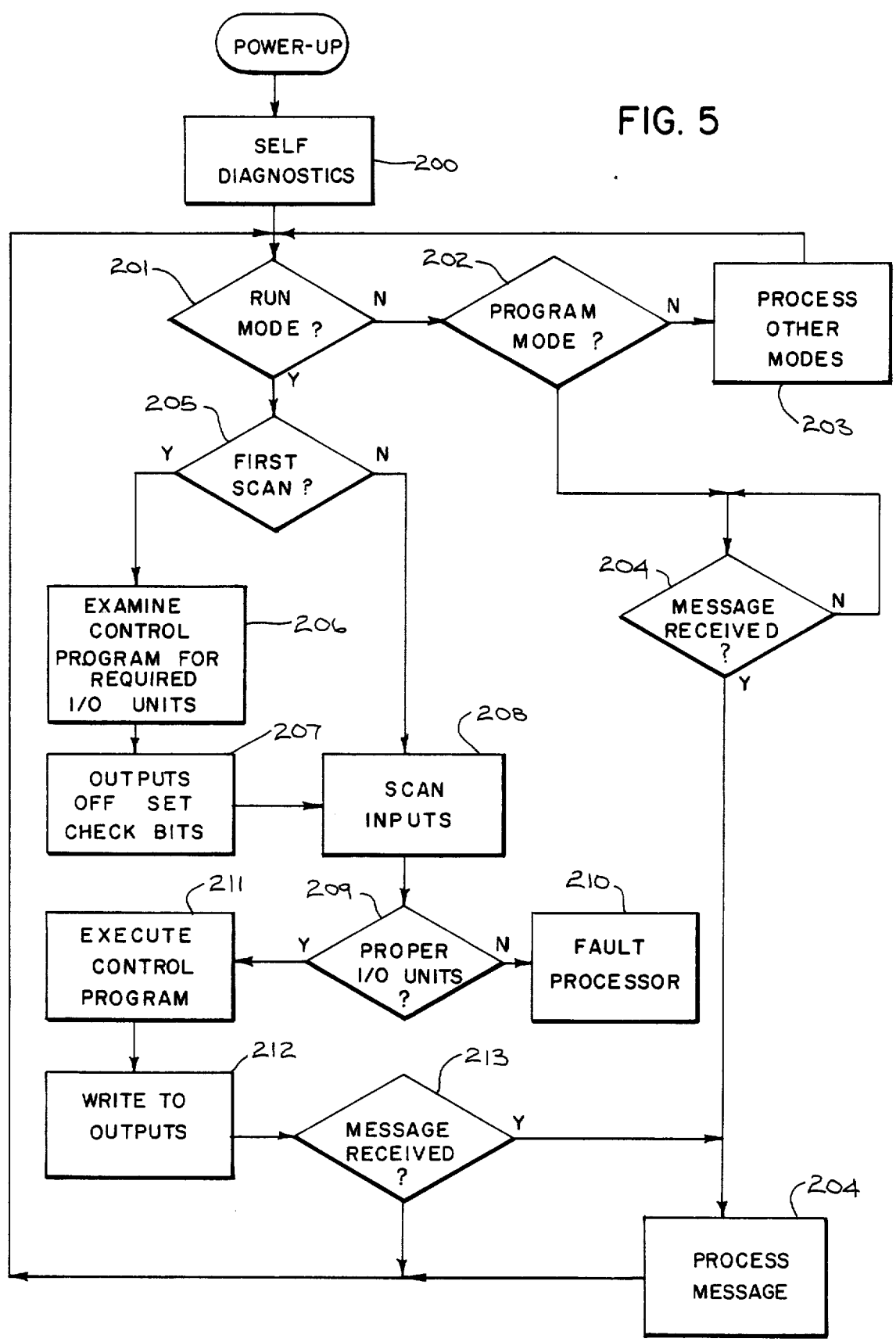
FIG. 5 is a general flow chart of the program which is executed by the processor unit of FIG. 2.

Referring to FIG. 5, when the programmable controller is first powered up, the microcomputer 20 executes a set of instructions indicated at process block 200 to perform a series of diagnostic tests on the hardware and the data structures. These instructions, as well as those now to be described are stored in the ROM 35. The mode of operation is then checked by executing instructions indicated at decision blocks 201 and 202 to determine if the controller is in either the RUN mode or the PROGRAM mode. There are numerous other modes of operation which are indicated collectively by the process block 203. These other modes and the programs required to execute them are not pertinent to the present invention and will not be described in detail.

When the controller is in the PROGRAM mode as determined at decision block 202, the system awaits receipt of messages from the programming unit 3. When messages are received, the microcomputer 20 is momentarily interrupted and the message data is saved in a message buffer (not shown) and a message flag is set. This message flag is checked at decision block 203, and if it is set, the system branches to process the message as indicated at process block 204. After processing the message, the system loops back to determine if the mode of operation has been changed.

Referring still to FIG. 5, when the controller is in the RUN mode, as determined at decision block 201, a test is made at decision block 205 to determine if the RUN mode has just been entered. If so, a program indicated by process block 206 is executed to examine each instruction in the user's control program. As will be described in more detail below with reference to FIG. 6, based on this examination the number of I/O modules 2 which must be connected to the controller 1 to provide the required number of I/O points is determined. Then, as indicated at process block 207, preset data is shifted out the serial I/O channel to each of I/O units 2 connected to the cable 6 (FIG. 1). The data is the same for each I/O unit 2, with six bits being set to zero to turn the outputs off and two check bits being set to one and zero, respectively. This preset output data is shifted out the serial I/O port as if six I/O units 2 were attached, even though some data may be lost when fewer units are in fact connected.

The system then performs an input scan as indicated at process block 208. As will be described in more detail below in connection with FIG. 7, sixteen bits are input from each I/O unit, and two of these are the check bits which were previously output. If an insufficient number of I/O units 2 are connected, or an I/O unit 2 is added after the first scan, an improper number of I/O units is detected at decision block 209 and the system branches to a fault processor 210. Otherwise, the user's control program 36 is executed as indicated at process block 211.

As is well known in the art, the user control program is comprised of instructions which examine the state of input points in the I/O image table 38, and make decisions concerning the state of the output points. The state of the outputs in the I/O image table 38 are then written to the I/O units 2 by shifting them out the serial I/O port on the cable 6, as indicated by process block 212. As described above, the byte of output data which is written to each I/O unit 2 includes six bits of output data and two check bits.

At the completion of the output scan a check is made at decision block 213 to determine if any messages have been received from the programming unit 3. If so, the message is processed at 204. In either case, the system loops back to determine the mode of operation. While in the RUN mode the controller continues to scan inputs, execute the user control program 36 and write new outputs. Typically each cycle through this loop requires less than twenty milliseconds, and if an I/O unit 2 is disconnected or becomes inoperable, a fault is immediately indicated.

Figure 6:
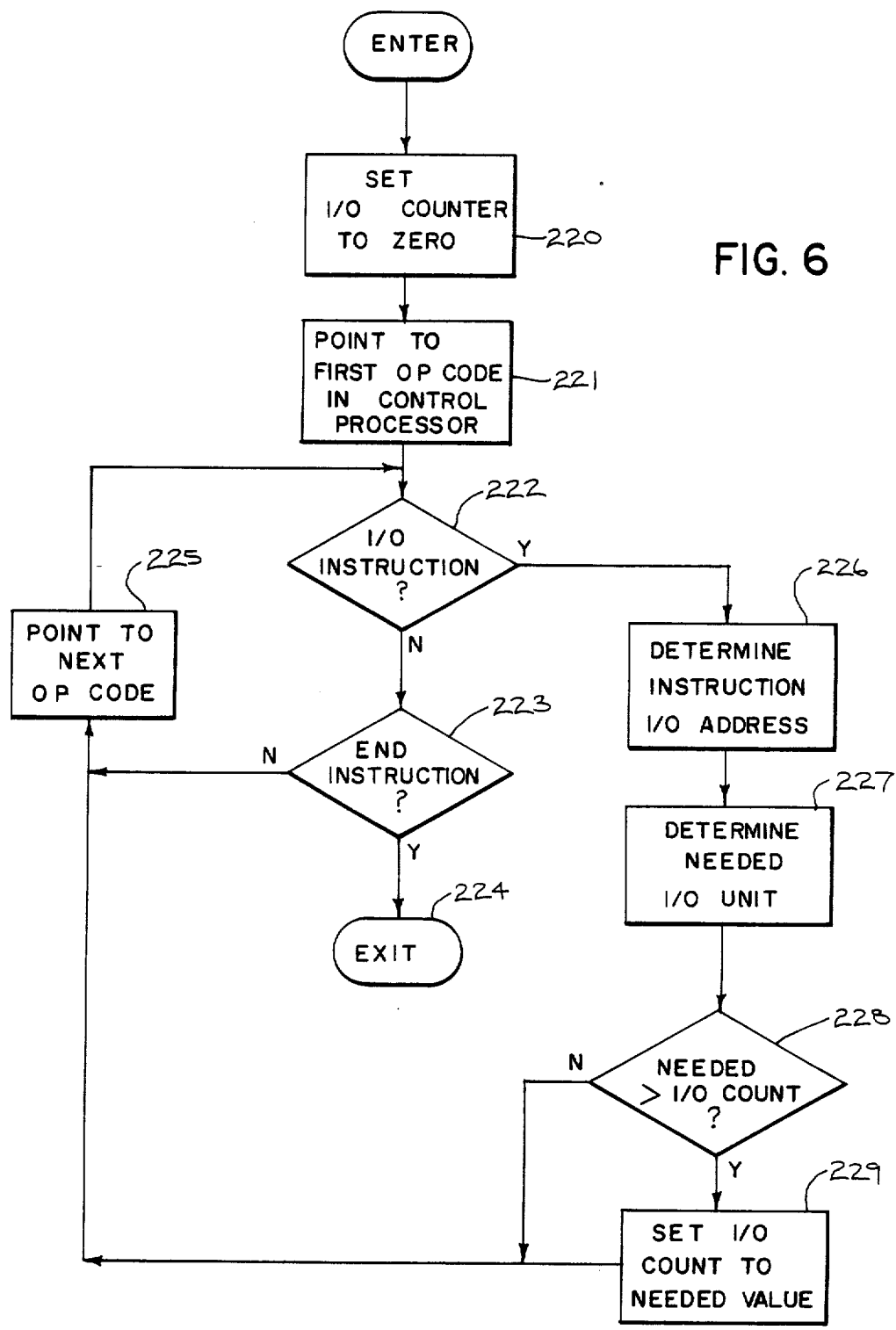
FIG. 6 is a detailed flow chart of a portion of the program of FIG. 5.

Referring particularly to FIG. 6, the process block 206 in FIG. 5 is illustrated in more detail. This process determines the number of I/O units 2 which are connected to the processor unit 1 when the controller is switched to the RUN mode. This number is stored in the RAM 39 (FIG. 2) at a location referred to herein as the "I/O counter." This I/O counter is set to zero at process block 220 and then a pointer is initialized at process block 221 to indicate the address of the operation code in the first instruction of the user control program 36.

A loop is then entered at decision block 222 in which each instruction in the user control program 36 is examined. If the instruction has an I/O address, the program branches at decision block 222. Otherwise, a test is made at decision block 223 to determine if the "END" instruction has been reached. If so, the process exits at 224; otherwise, the pointer is advanced at block 225 to the address of the operation code in the next user control program instruction.

As each instruction containing an I/O address is found at decision block 222, the I/O address is determined at process block 226 and the I/O unit number corresponding to that I/O address is determined at process block 227. As indicated at decision block 228, the I/O unit which is needed for the instruction is then compared with the value of the I/O counter. If it is greater than the I/O counter, then the I/O counter is set to this needed I/O unit number at process block 229. As a result, when the program exits at 224, the I/O counter has been set to indicate the required number of I/O units 2 needed to properly execute the user control program 36.

Figure 7:
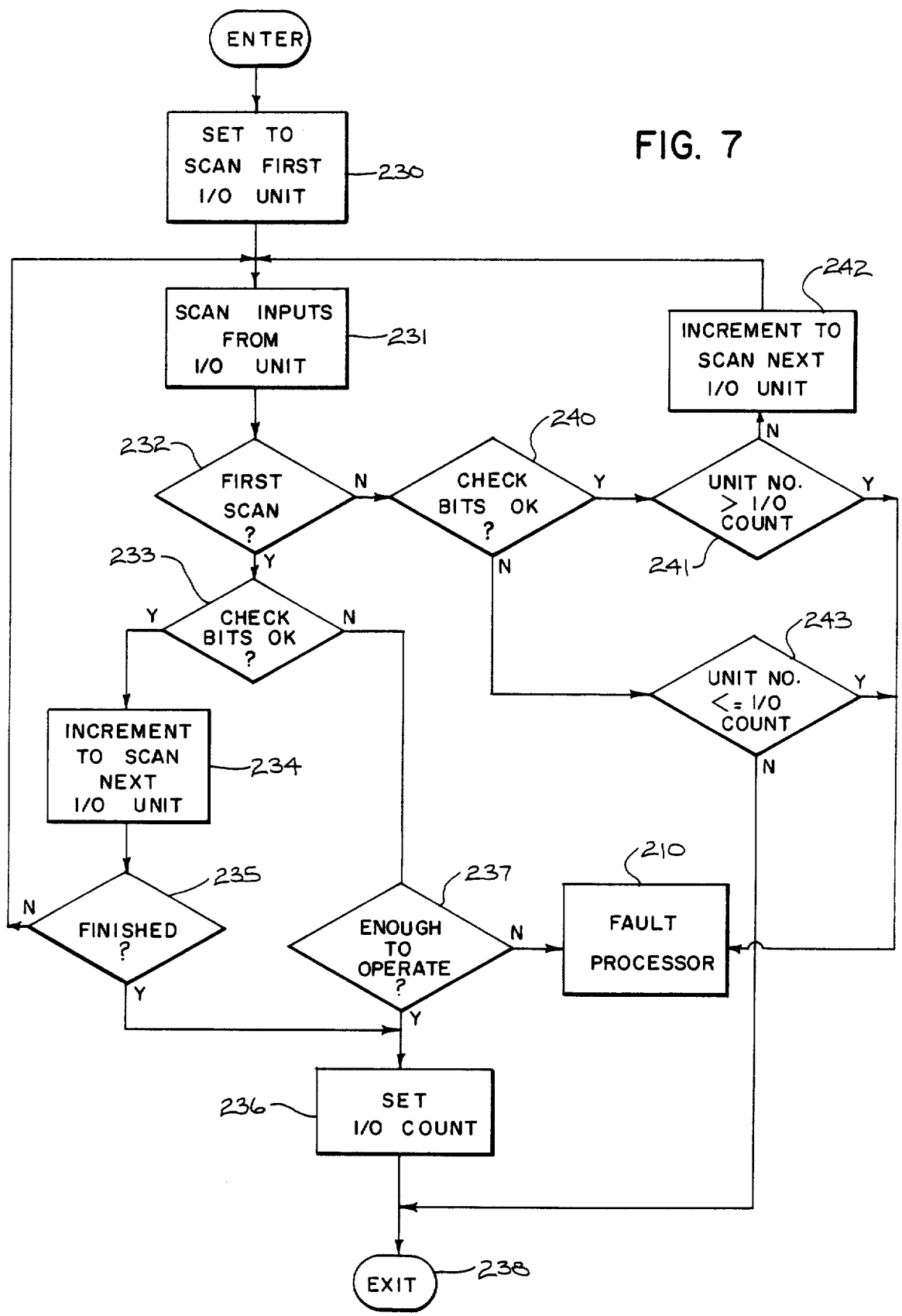
FIG. 7 is a detailed flow chart of another portion of the program of FIG. 5.

Referring particularly to FIG. 7, each time the controller performs an input scan (block 208 in FIG. 5), it checks to make sure the proper number of I/O units 2 are connected to the serial I/O port. As indicated at process block 230, a pointer is set to address the inputs for the first I/O unit 2 which are stored in the I/O image table 38 (FIG. 2). Sixteen bits are then input serially through the cable 6 and stored in the I/O image table 38, as indicated at process block 231. The system then branches at decision block 232 depending on whether this is the first input scan after the controller has been placed in the RUN mode.

During the first input scan the check bits which are input with each eight bit byte of data are examined at decision block 233. If they have remained in their "one-zero" state, the I/O unit 2 is presumed to be connected and operating properly. Accordingly, the input image table pointer is incremented at process block 234 to address the locations for the next I/O unit 2. A check is made at decision block 235 to determine if all six possible I/O unit 2 have been scanned, in which case the system branches to process block 236 which sets the I/O counter to six.

If the check bits are not correct as determined at process block 233, the I/O unit 2 from which the inputs were scanned is presumed not to be connected. In such case a test is made at decision block 237 to determine if the number of I/O units 2 which have been found to be connected is sufficient. This is accomplished by comparing this number with the I/O count previously calculated. If an insufficient number of I/O units 2 are connected, the system branches to process block 210 which halts the controller and visually indicates a fault condition. Otherwise, the I/O count is set to the number of I/O units 2 which are connected and the system exits at 238.

Referring still to FIG. 7, after the first scan the I/O count is set to indicate the number of I/O units 2 which are actually connected to the processor unit 1. During subsequent scans the system branches at decision block 232 and the check bits are examined at decision block 240. If they are correct, the I/O unit 2 is present and a check is made at decision block 241 to determine if this I/O unit number is greater than the I/O count. If so, the system branches to indicate a fault, since the I/O unit 2 was wrongfully connected while the controller was in the RUN mode. Otherwise, the system loops back through process block 242 to input data from the next I/O unit 2.

When the check bits are incorrect as determined at decision block 240, a test is made at decision block 243 to determine if sufficient I/O units 2 are connected. In other words, is the number of I/O units 2 which have been found to be connected equal to the I/O count? If so, everything is in order and the I/O scan is complete. Otherwise, an I/O unit 2 has been disconnected and a fault is indicated at process block 210.

It should be apparent that a number of variations are possible from the preferred embodiment described. For example, while the I/O units 2 are scanned by shifting in serial input data from all units and shifting data serially out to all the units, other I/O techniques may be employed. The I/O data may be transmitted as packets which contain an I/O address that identifies the I/O unit to which it belongs as described in U.S. Pat. No. 4,404,651.

I claim:

1. In a programmable controller having a processor unit which may be connected to one or more I/O expansion units, the combination comprising:
storage means in said processor unit for storing a user control program which includes instructions that direct the examination of input devices connected to I/O expansion units and instructions that direct the operation of output devices connected to I/O expansion units;
examination means coupled to the storage means for examining the user control program instructions and determining a highest number in a number range of the I/O expansion untis which are required to execute the user control program;
scanner means responsive to signals from the I/O expansion units for determining a number range of I/O expansion units which are connected to the processor unit;
comparison means coupled to the examination means and the scanner means for comparing a highest number in the number range of the I/O expansion units determined by the scanner means with the highest number in the number range of I/O expansion units determined by the examination means; and
means responsive to said comparison means for preventing execution of the user control program when the highest number in the number range of the I/O expansion units determined by the scanner means does not match the highest number in the number range of I/O expansion units determined by the examination means.

2. The programmable controller as recited in claim 1 in which the processor unit operates in a programming mode in which the user control program may be created or changed using a programming unit; and the examination means, scanner means and comparison means operate each time the processor unit is switched to a RUN mode in which it is to repeatedly execute the user control program.

3. The programmable controller as recited in claim 1 in which the examination means includes means for outputting a check bit to I/O units connected to the processor unit, and means for inputting said check bit from the I/O units which are attached to the processor unit.

4. In a programmable controller having a processor unit which may be connected to one or more I/O expansion units, the combination comprising:
storage means in said processor unit for storing a user control program which includes instructions that direct the examination of input devices connected to I/O expansion units and instructions that direct the operation of output devices connected to I/O expansion units;
examination means coupled to the storage means for examining the user control program instructions and determining addresses of the I/O expansion units which are required to execute the user control program;
scanner means responsive to signals from the I/O expansion units for determining addresses of I/O expansion units which are connected to the processor unit; and
comparison means coupled to the examination means and the scanner means for comparing the addresses of the I/O expansion units determined by the examination means with the addresses of I/O expansion units determined by the scanner means; and
means responsive to said comparison means for preventing execution of the user control program when the address of the I/O expansion unit determined by the examination means is not one of the addresses of the I/O expansion units determined by the scanner means.

* * * * *